United States Patent Office 3,489,601
Patented Jan. 13, 1970

3,489,601
POLYOLEFINS COATED WITH CHLORINE CONTAINING POLYMERS
Paul R. Stapp and Dixie E. Gilbert, Bartlesville, Okla., assignors to Phillips Petroleum Company, a corporation of Delaware
No Drawing. Filed Oct. 25, 1967, Ser. No. 677,857
Int. Cl. C09d 3/60
U.S. Cl. 117—138.8                    10 Claims

ABSTRACT OF THE DISCLOSURE

Polyolefin articles are coated with polymers and copolymers of vinyl halides by dissolving the vinyl halide polymers or copolymers in a solvent system containing certain 4-halotetrahydropyrans to form a solution which is then applied to the surface of the polyolefin article.

---

This invention relates to a method for coating plastic articles. In another aspect, this invention relates to a method of laminating polyolefin articles with vinyl halide polymers or copolymers. In another aspect, this invention relates to an improved solvent for the above-mentioned vinyl halide resins, the use of which would result in a more uniform, tightly adhering coating of said resins to polyolefin articles.

Polyolefin articles, such as polyethylene and polypropylene bottles and containers, have been widely used for packaging food, cosmetics, pharmaceuticals, and various other products. However, these articles suffer from the disadvantage of allowing some compounds, such as essential oils and some gases such as oxygen to permeate through the walls of the article. In order to reduce permeation of essential oils and gases through the walls of the container, it has been found necessary to coat the interiors of the containers. However, the coating procedures up to the present date, have been costly and not wholly satisfactory in that the coatings have not always been uniform and tightly adhering. Efforts are constantly being made to discover new methods, as well as solvents, wherein the desired coating material can easily be applied to the surface of the article to prevent the permeation losses.

One object of the present invention is to provide an improved method for coating a polyolefin article with a vinyl halide laminating material.

A further object of this invention is to provide an improved solvent for vinyl halide laminating resins, the use of which will allow clear solutions of these vinyl halide resins to be applied to the surface of polyolefin articles and will result in tightly adherent coatings of these resins on the polyolefin articles.

According to the invention, we have discovered that a tightly adherent, uniform coating of vinyl halide resins to a polyolefin article is made possible by dissolving the vinyl halide resin in a solvent containing certain 4-halotetrahydropyrans to form a solution which is then contacted with the article thereby producing the coating on the article of said vinyl halide resin.

The polyolefin articles which can be coated by the present invention include: containers, substrates, and preformed parisons of a polyolefin produced from monoolefins having 2-8 carbon atoms, inclusive, copolymers and mixtures thereof. For example, homopolymers and copolymers of ethylene, propylene, butylene, butadiene, and mixtures thereof.

The vinyl halide laminating resins that can be used according to the present invention include homopolymers of vinyl halides such as vinyl chloride and vinylidene halides such as vinylidene chloride; copolymers of vinyl halide with vinylidene chloride, vinylchloroacetate, chlorostyrene chlorobutadiene; copolymers of vinylidene halides such as vinylidene chloride with carboxylic acid vinyl esters such as vinyl acetate, vinyl propionate, vinyl butyrate, vinyl benzoate, esters of unsaturated acids such as alkyl acrylates, aromatic vinyl compounds, dienes, unsaturated amides, unsaturated nitriles, and unsaturated carboxylic acid esters.

A particularly preferred group of the above copolymers include copolymers formed from haloalkenes having 1 or 2 halogen atoms and from 2 to 4 carbon atoms, inclusive, and a cyanoalkene having from 3 to 6 carbon atoms, inclusive, such as a vinylidene chloride-acrylonitrile copolymer.

Examples of suitable haloalkenes include: vinyl chloride, vinylidene chloride, allyl chloride, isocrotylchloride, 1-chloro-butene-2, 2-chloropropene-1, β-methallyl chloride, α-methallyl chloride, γ-methallyl chloride. Suitable cyanoalkenes include: acrylonitrile, tetracyanoethylene, methaacrylonitrile, α-ethylacrylonitrile, and methylene glutaronitrile.

The 4-halotetrahydropyran solvents of this invention can be represented by the general formula:

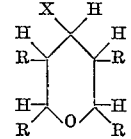

wherein X is a halo radical such as fluorine, chlorine, bromine, or iodine, and R is chosen from hydrogen or hydrocarbyl radicals such as alkyl, cycloalkyl, aryl, or combinations thereof, containing from 1 to 8 carbon atoms per radical, and where the total number of carbon atoms in the compound does not exceed 17. Examples of suitable 4-halotetrahydropyran compounds include 4-chlorotetrahydropyran, 4-bromotetrahydropyran, 4-iodotetrahydropyran, 4-fluorotetrahydropyran, 3 - methyl-4-chlorotetrahydropyran, 3-octyl-4-chlorotetrahydropyran, 2-propyl-4-chlorotetrahydropyran, 4-chloro - 2,3,6 - tributyltetrahydropyran, 4 - chloro-2,3,5,6-tetramethyltetrahydropyran, 4-bromo - 3 - cyclohexyltetrahydropyran, 4-chloro-2-methyl-5-phenyltetrahydropyran, 4-chloro-3-(2-methyl cyclopentyl)tetrahydropyran, and the like and mixtures thereof.

The 4-halotetrahydropyrans of this invention can be synthesized by any method known in the art. One method of synthesizing 4-halotetrahydropyrans is disclosed in Chemical Abstracts 51, 1156 (1957).

The 4-halotetrahydropyrans can be used alone or in combination with other known solvents for vinyl halide resins. Previous attempts in dissolving these vinyl halide resins in conventional solvents have oftentimes resulted in a thick gel or dispersion, which is sometimes quite lumpy and is very difficult to apply evenly over the surface of the polyolefin article, for example, the interior surface of a preformed parison. These previous attempts have oftentimes resulted in coatings that are discontinuous, discolored, and loosely adherent to the polyolefin article in localized areas. The use of the 4-halotetrahydropyran solvent makes the vinyl resin solution flow easy and distribute very uniformly and adhere tightly to the polyolefin article. The ratio of the vinyl halide resin to the 4-halotetrahydropyran solvent system will generally be from 1:99 to 35:65, depending upon the particular resin and the particular solvent, and the desired thickness of the film to be laminated on the polyolefin article. It is preferred that the 4-halotetrahydropyran be from 40 to 100 percent of the solvent system. Examples of other conventional solvents that can be used with the 4-halotetrahydropyrans include: toluene, methyl ethyl ketone, acetone, ethylacetone, ethylene dichloride, trichloroethylene, dimethylformamide, and cyclohexanone. Examples of suitable solvent systems other than the preferred 100 volume percent 4-halotetrahydropyran solvents are:

(a) 50 percent 4-chlorotetrahydropyran and 50 percent toluene;
(b) 60 percent 4-chloro-3-methyltetrahydropyran and 40 percent methyl ethyl ketone;
(c) 55 percent 4-chlorotetrahydropyran and 45 percent acetone.

The vinyl resin-4-chlorotetrahydropyran solutions are formed by thoroughly admixing the vinyl resin and the 4-chlorotetrahydropyran solvent or solvent system until the vinyl resin has dissolved. Generally, it is desirable to slightly warm the mixture to aid in faster dissolution. The warming temperature will vary with the particular vinyl resin and the particular 4-halotetrahydropyran, but will generally be in the range of 120–180° F.

In order to provide an effective barrier to permeability, it is only necessary that a very thin film of the vinyl halide resin be present. Any suitable coating technique known in the art can be utilized. For example, open-end preformed parisons can be coated by contacting the interiors of the preforms with the vinyl halide resin solution by a suitable method such as brushing or spraying. Other objects such as flat thermoforming stock can also be coated by brushing or spraying. Closed-end parisons can be coated by simply filling the parison with the vinyl halide resin solution and then withdrawing the liquid or by any other suitable means. The preformed parisons and thermoforming stock are generally coated with a layer of the polyvinyl resin solution which is about 1 mil thick. Containers and the other articles can then be formed from the parisons or substrates by conventional thermoforming methods such as vacuum forming and blow molding. These forming operations generally reduce the thickness of the vinyl halide resin to 0.1 to 0.2 mil. This thickness appears to be optimum for many uses, based upon data for clarity, adhesion and permeability resistance. For example, it has been demonstrated that the permeation rate of orange oil is reduced to one half, and the permeation rate of oxygen is reduced to one third through a polyvinyl chloride-lined polypropylene bottle compared to an unlined polypropylene bottle.

Also, if desired, by utilizing the vinyl halide resin-4-chlorotetrahydropyran coating solution with a plasticizer, parisons can be precoated and stored for months and then laminated objects can be formed without the necessity and special coating operations that must be adapted to each particular parison configuration. The plasticizer can be admixed into the 4-chlorotetrahydropyran either before or after the vinyl halide resin is dissolved therein. Examples of such plasticizers are dioctylphthalate, triethylcitrate, tricyclohexylcitrate, methyl phthalyl ethyl glycolate and the like.

The following examples are given to better illustrate the invention, but are in no way intended to limit the invention.

EXAMPLE 1

A 20 cc. portion of unplasticized polyvinylchloride and a 100 cc. portion of methylethylketone were placed into a container and mixed. The resulting mixture was heated to 200° F. until a cloudy slurry was formed. The slurry-solution was then applied to the interior of the preformed polypropylene parison by brushing and then was allowed to cool at room temperature. The parison was then placed into a bottle blowing apparatus and heated to 330° F. and then an 8-ounce bottle was blown. A visual inspection of the bottle indicated that the polyvinylchloride coating was poor. The coating was uneven and blistered and could easily be separated from the polypropylene bottle by pulling on the raised film around the blisters.

EXAMPLE 2

Next, 15 cc. of vinylidene chloride-acrylonitrile copolymer resin was mixed with 500 cc. of 4-chlorotetrahydropyran. The mixture was heated to 150° F. until a relatively clear solution was formed. The resulting solution was then brushed onto the interior of a preformed polypropylene parison. The parison was then placed into a bottle-blowing device, heated to 330° F. and an 8-ounce bottle was then blown. The resulting bottle appeared clear and there were no uneven or blistered places due to poor adhesion of the copolymer to the interior of the polypropylene bottle wall. Oxygen permeability tests were run, and indicated that the vinylidene chloride-acrylonitrile copolymer coating was continuous and complete and reduced the oxygen-permeation rate ⅓ that of the oxygen-permeation rate through an unlined 8-ounce polypropylene bottle.

The data from the two examples clearly indicate the unexpected properties of 4-halotetrahydropyrans as wetting and solvating agents for coating resins. The above examples clearly indicate that the use of the 4-halotetrahydropyran results in fast dissolution of the coating resin, and it reduces the viscosity of the resulting solution as well as prevents gel formation and generally imparts solution stability. As shown by the data, these factors combined to give a more uniform continuous coating of the polyolefin article.

We claim:

1. The method of coating a polyolefin article comprising dissolving a coating resin selected from vinylchloride polymers and copolymers; vinylidene chloride polymers and copolymers; copolymers of a chloroalkene having 1 or 2 chlorine atoms and from 3 to 4 carbon atoms, inclusive, and a cyanoalkene having from 3 to 6 carbon atoms, inclusive; and mixtures thereof in a solvent system which contains from 40–100 volume percent of a compound or mixture of compounds having the general formula

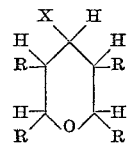

wherein X is a halogen and R is hydrogen or an alkyl, cycloalkyl, or aryl radical containing from 1 to 8 carbon atoms, and wherein the total number of carbon atoms per molecule of the compound does not exceed 17, wherein the ratio of said coating resin to said solvent system is 1:99 to 35:65, and then applying the resulting solution to the surface of said polyolefin article.

2. The method of claim 1 wherein said coating resin is polyvinyl chloride.

3. The method of claim 1 wherein said coating resin is a copolymer of chloroalkene having 1 or 2 chlorine atoms and from 3 to 4 carbon atoms, inclusive, and a cyanoalkene having from 3 to 6 carbon atoms, inclusive.

4. The method of claim 1 wherein said coating resin is a vinylidene chloride-acrylonitrile copolymer.

5. The method of claim 4 wherein said polyolefin is polyolefinpropylene.

6. The method of forming containers comprising:
(a) dissolving a coating resin selected from vinyl chloride polymers and copolymers; vinylidene chloride polymers and copolymers; copolymers of a chloroalkene having 1 or 2 chlorine atoms and from 3 to 4 carbon atoms, inclusive, and a cyanoalkene having from 3 to 6 carbon atoms, inclusive; and mixtures thereof in a solvent which contains from 40–100 volume percent of a compound or mixture of compounds having the general formula:

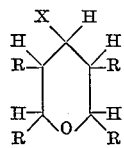

wherein X is a halogen, and R is hydrogen or an alkyl, cycloalkyl or aryl radical containing from 1 to 8 carbon atoms, and wherein the total number of carbon atoms in the compound does not exceed 17 wherein the ratio of said coating resin to said solvent is 1:99 to 35:65;

(b) applying the resulting solution to the surface of a parison or substrate; and (c) forming a container from the resulting coated parison or substrate.

7. The method of claim 6 wherein said solvent is 100 volume percent of said compound or mixture of compounds.

8. The method of claim 7 wherein said coating resin is a copolymer of a chloroalkene having 1 or 2 chlorine atoms, and from 3 to 4 carbon atoms, inclusive, and a cyanoalkene having from 3 to 6 carbon atoms, inclusive.

9. The method of claim 7 wherein said coating resin is a vinylidene chloride-acrylonitrile copolymer and said solvent is 4-chlorotetrahydropyran.

10. The method of claim 9 wherein said polyolefin is polypropylene.

References Cited
UNITED STATES PATENTS

| | | | |
|---|---|---|---|
| 3,014,045 | 12/1961 | Marcus et al. | 260—30.4 |
| 3,030,385 | 4/1962 | Marcus et al. | 260—30.4 |
| 3,037,994 | 6/1962 | Marcus et al. | 260—30.4 |

WILLIAM D. MARTIN, Primary Examiner

J. E. MILLER, Jr., Assistant Examiner

U.S. Cl. X.R.

117—161; 260—30.4; 264—134